United States Patent [19]

Chandler et al.

[11] Patent Number: 4,659,463
[45] Date of Patent: Apr. 21, 1987

[54] SYSTEM TO REMOVE CONTAMINANTS FROM WATER

[75] Inventors: James W. Chandler; William D. Chandler, both of Ashland, Ohio

[73] Assignee: Water Soft, Inc., Ashland, Ohio

[21] Appl. No.: 659,327

[22] Filed: Oct. 10, 1984

[51] Int. Cl.$^4$ .................. C02F 1/74; B01D 15/00
[52] U.S. Cl. .................. 210/202; 210/218; 210/261; 210/264; 210/284; 210/290
[58] Field of Search .......... 210/664, 718, 722, 284, 210/290, 201–203, 150, 151, 205, 206, 218, 264, 266, 261

[56] References Cited

U.S. PATENT DOCUMENTS

| | | | |
|---|---|---|---|
| 2,237,882 | 4/1941 | Lawlor et al. | 210/722 |
| 3,167,506 | 1/1965 | Fackler et al. | 210/722 |
| 3,222,277 | 12/1965 | Joyce | 210/722 X |
| 3,649,532 | 3/1972 | McLean | 210/718 |
| 4,430,228 | 2/1984 | Paterson | 210/722 X |

Primary Examiner—Tom Wyse
Attorney, Agent, or Firm—Renner, Otto, Boisselle & Lyon

[57] ABSTRACT

A system to remove contaminants from water includes, in the pressurized water flow lines, a venturi nozzle assembly to entrain air in the water, a pressure tank to store and deliver the air laden water, an aerator/precipitator tank assembly to remove the excess air and any residual gases from the water in the pressurized system and to remove contaminants from the water and a filter tank having a filtration bed therein to remove the remaining precipitated contaminants from the water and to deliver the water to service. The aerator/precipitator tank assembly includes a top manifold sealed on the tank having an inlet operative to spray air laden water into the tank and an outlet selectively operative to vent excess air from the tank while maintaining system pressure, a float valve assembly carried by the manifold selectively operative to open when excess air builds up in the tank to vent the excess air through the manifold outlet and a layer of calcium carbonate rocks in the bottom of said tank to continue removing iron contaminants from the water moving downwardly therethrough.

22 Claims, 6 Drawing Figures

Fig. 1

SYSTEM TO REMOVE CONTAMINANTS FROM WATER

FIELD OF THE INVENTION

The present invention relates to a system for removing contaminants from water by oxidation, precipitation and filtration or, with some modifications, by hydrolysis, oxidation, precipitation and filtration.

BACKGROUND OF THE INVENTION

Well water contains many contaminants. If not removed from the water, these contaminants may present health risks, may damage plumbing and personal property and may adversely affect the taste of the water. The prinicpal contaminants naturally occurring in well water are iron, sulphur and manganese. Many man-made contaminants are also now found in well water. These man-made contaminants, generically defined as halogenated organics, may be introduced into the water supply as part of or as by-products of herbicides, pesticides, fertilizers and the like placed on and into the ground. These halogenated organics are believed to be carcenogenic and may present serious long term health risks to users of this contaminated water.

Many different systems have been developed in an attempt to remove contaminants from our water supply, be it a central water system or a well system. The three main system types for contaminant removal consist of chlorination, ion exchange and filtration. In the filtration type, the McLean and Patterson water treatment systems for removal of iron contaminants are believed to be the most relevant to the water treatment system of the present invention.

In the McLean system, as shown in McLean U.S. Pat. No. 3,649,532, the well water passes through a venturi type apparatus to entrain air into the water, and this air laden water is then introduced into a filter tank. The venturi apparatus is theoretically controlled to introduce only enough air into the water to cause the iron contained in the water to change into a colloidal form. The air intake is limited so as not to oxidize the iron contained in the water stream. The water with the iron in colloidal form passes into a filter tank and then the filtration bed contained in the filter tank. This filtration bed slowly raises the pH of the water passing therethrough while filtering the iron hydroxide and other impurities therefrom. The Patterson system has an air inlet that must be closely controlled to cause the iron to go into a colloidal state for removal as iron hydroxide.

The Patterson iron removal system includes a micronizer in the water line leading to the filter tank. The micronizer adds air to the water and converts the ferrous and ferric iron into tiny electrically charged particles. The air laden water with the charged iron particles is then passed through a media bed carrying an opposite charge to attract the iron particles. The iron particles then electrostatically cling to the filter media, with the entire media bed depth being utilized for this electrostatic removal of iron particles. The Patterson system requires the micronizer to be carefully set to control the amount of air introduced into the water and requires a specialized media bed preconditioned at the factory to have the opposite charge to the iron particles leaving the micronizer.

SUMMARY OF THE INVENTION

The prinicpal object of the present invention is to remove contaminants from the water by introducing as much air as possible into the water to oxidize and precipitate the contaminants therein. A venturi nozzle assembly is employed in the invention to maximinze air input into the water, with no special controls, adjustments or settings of the venturi assembly being required. This venturi assembly preferably has a water bypass means normally closed by a dual layer diaphragm that flexes to allow additional water to enter the system when a predetermined back pressure condition exists.

Another object of the present invention is to provide an aeration/precipitation tank assembly in the system for removing contaminants which sprays air laden water into an air column to further oxidize the contaminants contained in the water while maintaining the system water pressure. A manifold having a perforated spray plate inlet and an air outlet is threadably sealed to the top opening of the aeration/precipitation tank.

It is yet another object of the present invention to provide a float valve assembly in the aeration/precipitation tank operative intermittently to vent air from the aeration/precipitation tank when excess air volume builds up in the air column of the tank. This float valve assembly cooperates with the manifold on the aeration/precipitation tank to vent this pressurized air through the air outlet in the manifold for very brief intermittent periods.

Still a further object of the present invention is to provide a system for removing contaminants from water that can be readily modified or changed to remove as many of the specific contaminants contained in the water being treated as possible, including halogenated organics. To this end, an additional neutralizing tank or tanks and/or different filter materials may be used with the venturi nozzle assembly, pressure tank, aeration/precipitation tank and filter tank of the present invention.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF PREFERRED EMBODIMENT

Figure 1:
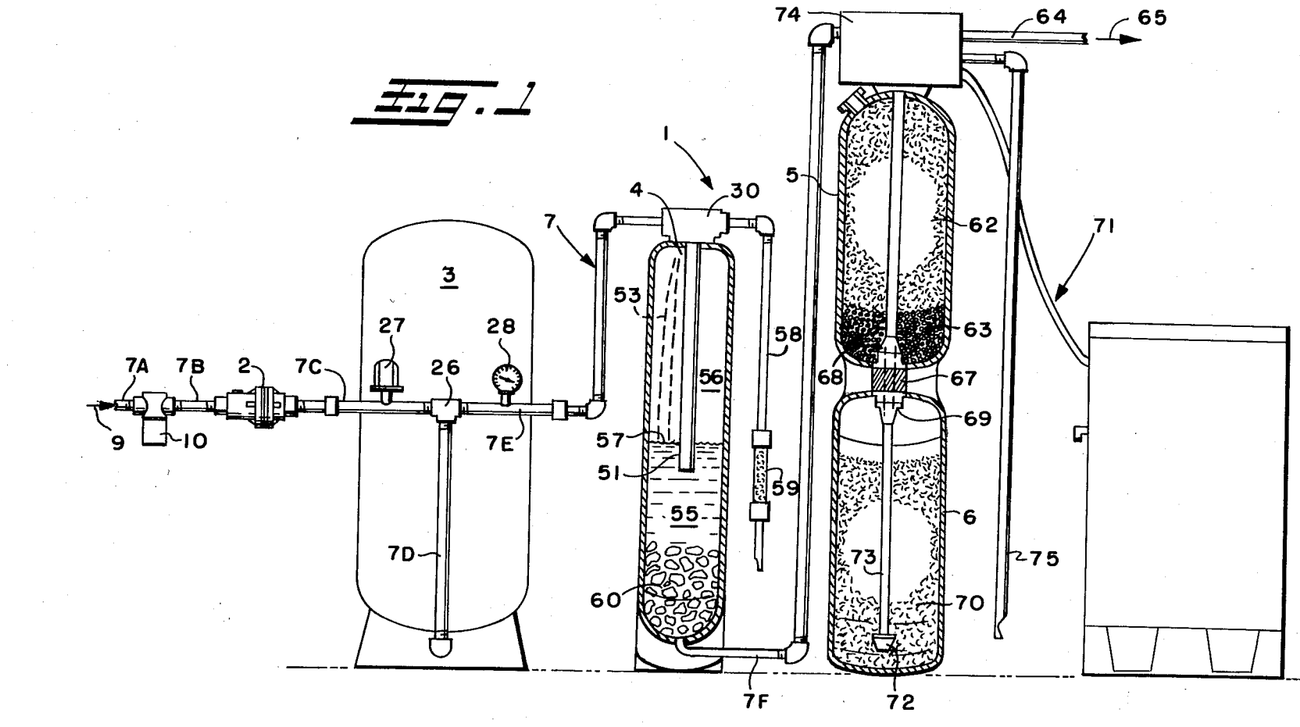
FIG. 1 is an elevation of the system to remove contaminants from water, with portions of such system being shown in section for clarity of illustration.

Turning now in more detail to the invention and initially to FIG. 1, the water treatment system of the present invention, indicated generally at 1, includes, as principal structural components, a venturi nozzle assembly 2, a pressure tank 3, an aerator/precipitator tank assembly 4, a filter tank 5 and, when needed, a water softening tank 6. These principal structural components of the water system are fluidically interconnected by water pipes indicated generally at 7.

Ground or well water contains contaminants which should be removed to the extent possible to purify the water and improve its taste. The naturally occurring contaminants include, for example, iron, sulfur and manganese, and certain man made contaminants, such as hologenated organics, may also be contained in the water. As discussed in more detail hereinafter, the system of the present invention may be modified or changed as necessary for the specific water being treated.

This raw water, normally from a well, is delivered to the system under pressure by a conventional pump (not shown). This raw water flows through pipe 7A in the direction indicated by the arrow 9. This raw water passes through a strainer 10 to remove any large pieces of sediment. The water then moves from the strainer 10 through pipe 7B to the venturi nozzle assembly 2. The water entering the venturi nozzle has air introduced therein by suction created in the venturi nozzle assembly due to the water flow and the differential pressure existing between the pump and the pressure tank as described in more detail below.

Figure 2:
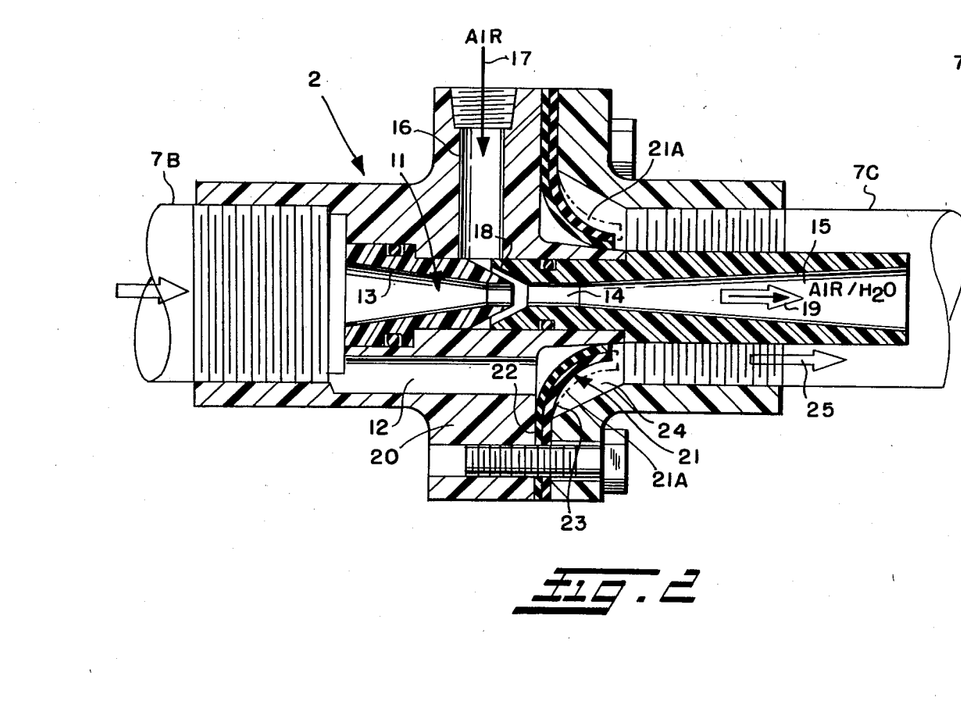
FIG. 2 is a cross-section of the venturi nozzle assembly used in the system of FIG. 1 schematically showing the water and air flow through the venturi nozzle assembly.

As best shown in FIG. 2, the venturi nozzle assembly 2 includes a venturi nozzle 11 and three normally closed water bypasses 12. The water line 7B provides a common supply for the ventrui nozzle 11 and for bypasses 12, with the water flow through the respective passage and bypasses being sequentially described for clarity and understanding.

The venturi nozzle 11 includes a converging section 13, a throat 14 and a diverging section 15. Water from line 7B moves through venturi nozzle 11 by passing through converging inlet section 13, throat 14 and diverging outlet section 15. This water movement through venturi nozzle 11 increases water velocity and decreases pressure, which in conjunction with the differential pressure between the pump and pressure tank 3, creates a vacuum effect drawing air through a Schraeder valve and entry port 16 into the venturi nozzle assembly 2, as schematically indicated by arrow 17. The radially inner end of entry port 16 communicates with an annular, forwardly projecting air passage 18 which intersects the throat 14 of venturi passage 11.

The air drawn into port 16 gets annularly uniformly distributed in and oriented in the direction of water flow by passage 18. This air is then entrained in and mixed with the water moving through venturi passage 11. This air laden water emerging from the venturi nozzle 11 is schematically illustrated by the arrows within arrows designated by the reference numeral 19.

This venturi nozzle assembly 2 is designed to entrain as much air as possible in the water to make sure sufficient oxygen exists in the water to obtain substantial oxidation of the contaminants contained in the water. The air laden water 19 leaving convergent section 15 of venturi passage 11 passes from the venturi nozzle assembly 2 through water line 7C with or without additional water being added.

In this latter regard, the three water bypasses 12 are circumferentially spaced at 120° increments in the housing 20 of venturi nozzle assembly 2. The downstream ends of bypasses 12 are normally closed by a laminant annular diaphragm, indicated generally at 21, made of flexible material, such as rubber or the like. As shown in FIG. 2, the laminant diaphragm 21 includes a first layer 22 in frictional contact with second layer 23. This laminant diaphragm 21 is anchored at its periphery to the housing 20 of the venturi nozzle assembly 2 and extends radially inwardly therefrom across annular channel 24 in housing 20 into curved engagement with the annular outer diameter of the convergent section 15 of venturi nozzle 11. The flexible laminant diaphragm 21 normally contacts the OD of the venturi nozzle to close bypasses 12 to block water flow through the bypasses.

However, when sufficient water pressure builds up behind the laminant diaphragm 21 or when the water volume throughput cannot meet service demands, the laminant diaphram 21 flexes to move away from the outer diameter of the venturi nozzle as indicated in phantom lines 21A to permit water to flow past the diaphragm and through channel 24, as indicated by the arrow 25, for subsequent mixture with the air laden water 19 in pipe 7C. When the over pressure condition terminates or the water volume demand is met, the laminant diaphram 22 returns as a result of material memory to its normal orientation blocking the water flow in bypasses 12.

The dual layer diaphragm can be designed to flex at a selected water pressure appropriate for the specific system being installed. By having normally closed bypasses, the dual layer diaphragm is, in effect, creating a back pressure on the system to increase the pressure on the pump side and thus increase the pressure differential between the pump and pressure tank, thereby to result in additional air being drawn into the water. The dual layer diaphragm provides additional life while retaining its material memory.

The air laden water moving through line 7C then enters or bypasses pressure tank 3. If water is not being demanded for service, the air laden water flows through line 7C, tee-fitting 26, and line 7D into pressure tank 3. If water is being demanded for service, the air laden water moves through line 7C and tee-fitting 26 into line 7E, thereby bypassing the pressure tank 3.

The pressure tank 3 is a vessel for storing water under pressure for subsequent delivery to service. By thus storing water under pressure, the pump does not need to run on a continuous basis but runs only upon demand.

For example, the pressure tank 3 includes a bladder inflated to maintain a pressure of at least 30 p.s.i. in the system. The pump has a capacity to deliver water at a pressure of at least 50 p.s.i. The water delivered by the pump enters the presure tank 3 and ultimately increases the pressure therein to the 50 p.s.i. level. At this point, pressure sensor 27 shuts off the pump through a conventional feedback system not shown. When water is drawn from pressure tank 3 for filtration and service, the water pressure in pressure tank 3 decreases, with this decrease being monitored by sensor 27. When the water pressure in pressure tank 3 decreases to 30 p.s.i., the sensor 27 activates the pump to deliver additional water under pressure to the pressure tank 3 to again increase the water pressure in such tank to 50 p.s.i. The pressure of the water being delivered from tank 3 to the system for filtration and service can be continually monitored by pressure gauge 28 in line 7E.

Figures 3, 4, 5:
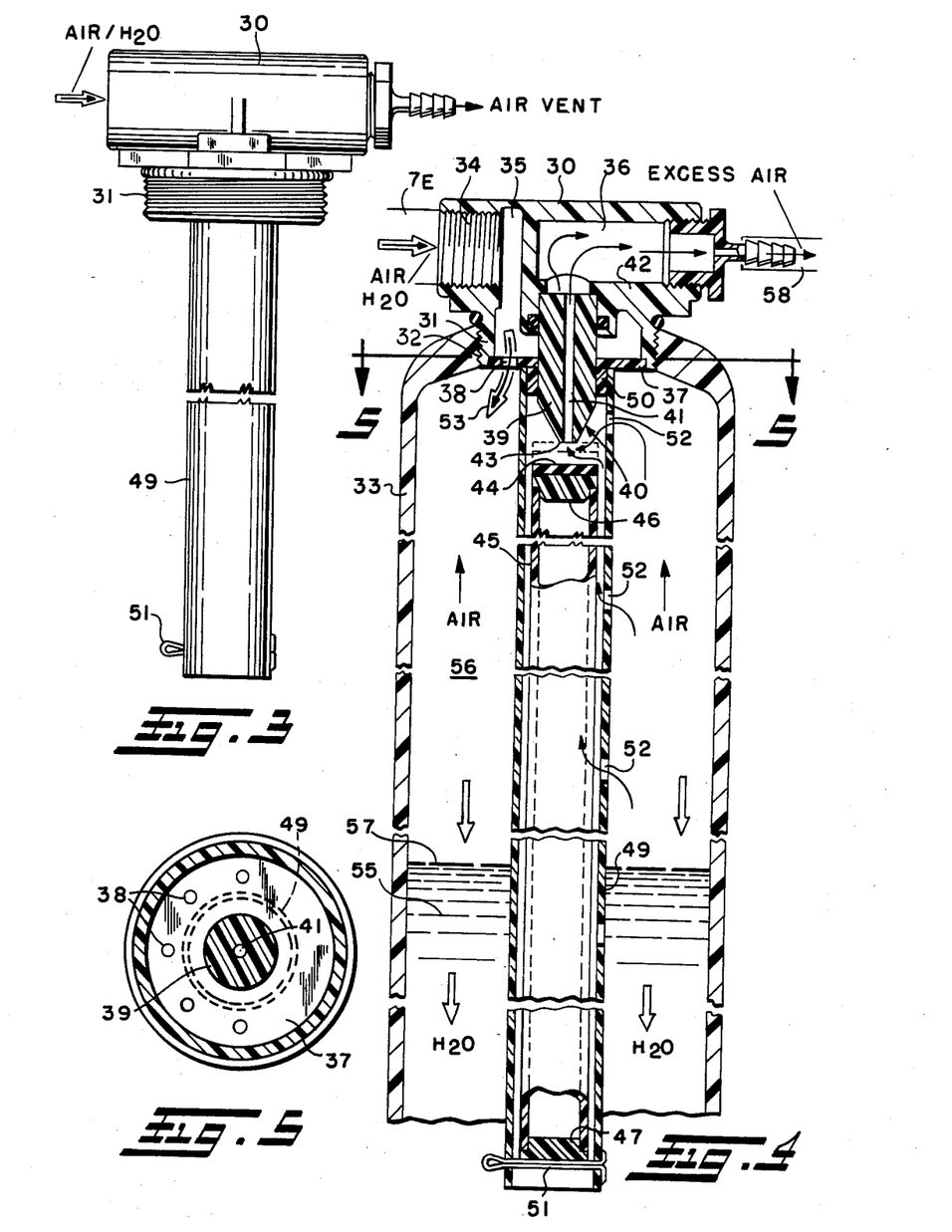
FIG. 3 is an elevation of the manifold and float valve assembly used with the aerator/precipitator tank of the water treatment system of the invention.
FIG. 4 is a section of the aerator/precipitator tank assembly with the manifold and float valve assembled thereon and with the air and water flow being schematically illustrated.
FIG. 5 is a cross section taken along the plane 5—5 of FIG. 4 showing the spray plate and valve core operatively assembled with the manifold.

The air laden water moving through line 7E enters the manifold 30 on aerator/precipitator tank assembly 4. As best shown in FIGS. 3 and 4, the manifold 30 has a downwardly extending externally threaded flange 31. The external threads on flange 31 threadably mate with the female threads in the cylindrical opening 32 of aerator/precipitator tank 33, whereby the manifold 30 is removably mounted on tank 33. The manifold 30 has inlet port 34, an annular inlet chamber 35 and an outlet port 36. The bottom of the annular inlet chamber 35 is partially closed off by a plate 37 having spaced orifices 38 in one half thereof. The plate 37 is frictionally carried by the valve core body 39 of the float valve assembly, indicated generally at 40.

The valve core body 39 has a bore 41 passing therethrough. The upper end of the valve core body 39 is snap fit in and sealingly received by a partition 42 in manifold 30. The float valve assembly 40 is thus suspended from and mounted to the parition 42 in manifold 30. The upper end of bore 41 in valve core body 39 fluidically communicates with air outlet port 36 in manifold 30. The lower end of bore 41 in valve core body 39 selectively communicates with the inside of tank 33.

In this regard, the lower end of valve core body 39 is of frusto conical shape to define a valve seat 43 on its bottom end. The upper surface 44 of float 45 is normally urged against valve seat 43 to close passage 41. The float 45 consists of a hollow elongated tube closed at its end by caps 46 and 47. This float 45 is bouyantly received in the water contained in tank 33, and is free to move vertically as the water level changes.

This vertical movement of the float is guided by a cylindrical float guide 49 surrounding float 45 in closely spaced relationship. The float guide 49 is fixedly connected to valve core body 39 by means of a spacer 50. A cotter pin passing through and across the bottom of tubular guide 49 acts as a bottom stop 51 to limit the downward movement of float 45. The tubular guide 49 has therein a plurality of vertically spaced, aligned apertures 52, which are preferably diametrically opposite from spray orifices 38 in plate 37. The aligned apertures 52 in guide 49 act as air vents during operation of the aerator/precipitator tank assembly 4.

In such operation, air laden water enters manifold 30 by way of inlet 34 and passes into chamber 35. This air laden water is then sprayed into tank 33 by passing through apertures 28 in plate 37. By spraying the air laden water into tank 35 as indicated at 53, the water is further exposed to oxygen to enhance the oxidation of the contaminants in the water to form precipitates therein. Further as a result of spraying the air laden water into tank 33, the entrained air and any residual non-oxidized gases in the water, such as $H_2S$, methane, natural gas or the like, are separated from the water resulting in a water column 55 in the bottom of tank 33 and an air and gas column 56 in the top of tank 33. This tank is maintained under system pressure with the water level therein being self regulating to normally be just high enough to keep top surface 44 of the float 45 against seat 43 to close bore 41.

However, as the air and gases separated from the water build up in tank 33, the air and gas volume in the tank increases to cause the water level in tank 33 to decrease slightly for very brief time intervals. When the water level 57 of water column 55 decreases, the float 45 bouyantly held in such water will similarly move briefly downwardly. This instantaneous downward float movement results in the bore 41 of valve core body 39 being briefly uncovered. The air and gases in tank 33 can then be vented to atmosphere by passing through apertures 52 in guide 49, bore 41 in valve core body 39 and outlet port 36 in manifold 30. The vented air and gas travels through a drain line 58 and then through a vapor phase carbon filter 59 to atmosphere for removal from the system 1. When sufficient air and gas have been vented, the water level 57 again quickly rises to elevate float 45 into contact with seat 43 to close bore 41. Thus the excess air introduced into the water and any non-oxidized gases contained in the water can be removed from the system while maintaining the water under system pressure.

This water in water column 55 is forced under the system pressure through a layer of large calcium carbonate rocks 60 at the bottom of tank 33. These calcium carbonate rocks in the aerator/precipitator tank assembly become coated with a layer of ferric hydroxide removed from the water moving through the rocks. This ferric hydroxide layer on rocks 60 tends to help convert ferrous oxides in the water to ferric hydroxides on the calcium carbonate rocks. After passing through calcium carbonate rocks, the water leaves the bottom of tank 33 and moves under system pressure through water line 7F toward filter 5.

Filter 5 includes a mixed filter bed 62 and a gravel underbed 63. The mixed filter bed 62 contains approximately one-third by volume insoluble catalyst, one-third by volume non-hydrous aluminum silicate and one-third by volume ground calcium carbonate. This mixed bed may also inlcude some reactive magnesia oxide beads to raise the pH even higher than 7.0. These reactive magnesia oxide beads are sold by Clack Corporation under the trademark COROSEX. The water from the aeration/precipation tank flows through line 7F and then down through the mixed filter bed and gravel underbed.

In the mixed bed, the calcium carbonate acts to raise the pH of the water passing therethrough to make sure that the oxidation and precipitation is completed on the water contaminants, as well as correcting a low pH water condition, should it exist. The insoluble catalyst material, marketed, for example, by Clack, Corporaton under the trademark BIRM, acts to convert ferrous oxides to ferric hydroxides for precipitation and removal. The non hydrous aluminum silcate material, also marketed by Clack Corporation under the trademark FILTER AG, is relatively lightweight, is irregular in size to nest better and creates a good filtration bed. All of the components of the mixed filtration bed act as a good mechanical or physical filters to remove the precipitated contaminants from the water by depositing the same in the mixed filtration bed. The water then passes from the mixed filter bed into the gravel underbed, which distributes or channelizes the water flow to provide a well dispersed and uniform flow.

When water softening is not required, the thus filtered water moves from the gravel underbed through a slotted basket and then into a riser tube. The riser tube is centrally embedded in the filtration bed of filter tank 5 and fluidically communicates with water servcie line 64. The treated water moves through line 64 as indicated by arrow 65 for delivery to the house system upon demand.

When water softening is required, the filtration tank 5 is superimposed upon and fluidically coupled to water softening tank 6. In this regard, a coupling sleeve 67 is threaded at its top into a bottom opening in filter tank 5 and is threaded at its bottom into a threaded opening in the top of softening tank 6. A first, inverted slotted basket 68 is positioned above the coupling sleeve 67 to retain the gravel underbed 63 in the filter tank 5 and to permit water to pass through the gravel underbed 63 into coupling sleeve 67. A second slotted basket 69 is mounted on the bottom of coupling sleeve 67 in water softening tank 6 to allow the water flowing through coupling sleeve 67 to enter softening tank 6.

The water entering the water softening tank flows downwardly through a high capacity softening resin 70 contained within tank 6. Brine is also introduced into the softening tank as needed to regenerate the softening resin. This brine is delivered to the water softening tank from a brine supply tank and supply hose indicated generally at 71. The brine passes downwardly through the filter tank 5 into the water softening tank 6. This brine will not hurt the filter bed in tank 5 nor will the filter bed hurt the brine.

The filtered and softened water reaching the bottom of softening tank 6, then passes through slotted basket 72 into riser tube 73 under system pressure. The riser tube 73 extends centrally upwardly through softening tank 6, coupling sleeve 67 and filter tank 5. This riser tube 73 is thus common to both filter tank 5 and softening tank 6 and is of smaller diameter then the coupling sleeve 67 to define therebetween an annular flow channel communicating between the interiors of tanks 5 and 6.

When the filtration bed 5 becomes clogged with removed precipitates, the filter bed and softening tank can be backwashed and regenerated. To this end, a valve indicated generally at 74 is moved from the service mode to the backwash mode. By so doing, the entry line 7F to bed 62 is reoriented to communicate with riser tube 73, the service line 64 from riser tube 73 is closed and backwash drain line 75 is open to communicate with filter housing 5. Backwash water then passes through line 7F, riser tube 73, basket 72, and then upwardly through water softening tank 6, coupling sleeve 67 and filter tank 5. This backwash water then leaves filter tank 5 through drain line 75. Upon completion of the backwashing procedure, the valve 74 is returned to its service mode to reorient the filter tank and water softening tank plumbing for service use in the system.

This water treatment system is adapted to oxidize, precipitate and remove contaminants from the water, principally iron, sulphur and manganese. The particular make-up of the well water varies from place to place, and the system can be modified and adapted to treat the water in the given locale. These adaptations and modifications principally relate to varying the constituents of the filter beds to best control the pH of the water for the contaminants being removed and for the pH level of the water being treated. For example, sulfur oxidizes and precipitates better at lower pHs, whereas iron oxidizes and precipitates better at higher pHs. With the system just described, the pH of the water is not substantially elevated until movement through the mixed bed in the filter tank. This system thus allows the sulphur to oxidize and precipitate in the aeration/precipitation tank and the iron to continue its oxidation and precipitation in such aeration/precipitation tank. Thereafter, the pH is raised in the filter tank by the calcium carbonate to complete the precipitation and removal, with the BIRM material acting as a catalyst to convert any remaining ferrous oxides to precipitated ferric hydroxides.

In the aeration and precipitation tank, not only is precipitation generally carried out but also chemical conversions or reactions can occur with or without precipitation. In this regard, water conditions may dictate other modifications and changes to the system to provide the best possible water under the circumstances.

For example, water in some areas of the country contains high levels of halogenated organics. These halogenated organics, for example, ethylene dibromide, are intorduced into the ground water from herbicides, pesticides, fertilizers and the like. These halogenated organics are believed to be carcenogenic and should be removed from the water to the extent possible. To this end, the water filtration of the present invention can be modified to include a neutralizing tank system upstream of the venturi nozzle assembly 2 and a different type of filtration bed in fitler tank 5.

Figure 6:
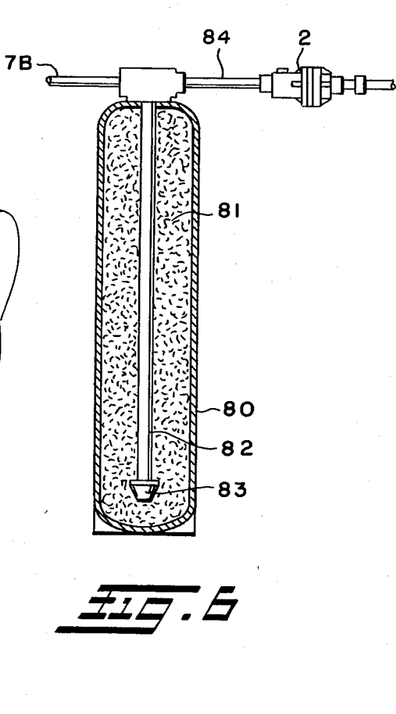
FIG. 6 is a cross section of a neutralizing tank incorporated in the system upstream of the venturi nozzle assembly, when required.

As best shown in FIG. 6, this neutralizing tank 80 is filled with crushed calcium carbonate 81. A distributor tube 82, which is centrally embedded in the crushed calcium carbonate, has a slotted basket 83 at its lower end and is connected at its upper end to the inlet line 7B. Water passes from line 7B downwardly through the distributor tube 82 and slotted basket 83 and then rises upwardly through the calcium carbonate neutralizing bed 81. As the water moves upwardly through the bed, the pH of the water is gradually increased to at least 7.0. The water with this elevated pH then passes out of the tank and into line 84 leading to the venturi nozzle assembly 2. By raising the pH in the water containing halogenated organics, hydrolysis of the halogenated organics in the water can occur more quickly. For example, hydrolysis of the ethylene dibromides contained in the water to ethylene glycol and hydrobromic acid can occur in the neutralization tank, with the neutralizing media of calcium carbonate removing most of the converted hydrobromic acid. This hydrolosis of the halogenated organics is necessary before oxidation and elimination of these contaminants can occur. By initially raising the pH with a neutralizing tank upstream of the venturi nozzle assembly, some sacrifice may be made in the removal of sulphur contaminants, if sulphr contaminants occur in the water being treated. However, this sacrifice, to the extent it may exist, is a required compromise since the halogenated organics are more detrimental water contaminants than the sulphur contaminants. Moreover, if necessary, the pH may be artificially raised even higher to enhance the hydrolysis in the water. To this end, reactive magnesia oxide beads (e.g. COROSEX) can be mixed into the neutralizing bed (and/or the filter bed) further to raise the pH far above 7.0 as required by the water being treated, for example in the range of 8.0–9.5.

The addition of air into the water at the venturi assembly oxidizes the contaminants contained therein and further converts the halogenated organics. In this regard, the eythylene glycol emerging from the neutralizing tank is converted by oxidation in the aeration and precipitation tank to carbon dioxide and hydrobromic acid. If only halogenated organics are contained in the water being treated, no precipitates per se will form in the aeration/precipitation tank. It will be understood that the term aeration/precipitation tank, assembly or means, as used herein, generically defines means operative to aerate and precipitate, to aerate and convert by oxidation and/or to aerate, precipitate and convert.

This oxidation, conversion and removal of halogenated organics can be enhanced in the system of the present application by modifying the filter bed used in filter tank 5. For this purpose, a stratified filter bed is preferably used consisting of a top layer of activated carbon, a middle layer of calcium carbonate and a bottom layer of gravel. The activated carbon bed acts to adsorb the remaining traces of halogenated organics, the neutralizing calcium bed acts to neutralize acid byproducts and to complete precipitation and removal of any iron contaminants including the mechanical or physical filtration of the same and the gravel underbed acts to uniformly distribute the channelized water flow from the filter to service.

It will be apparent from the foregoing that changes may be made in the details of construction and configuration without department from the spirit of the invention as defined in the following claims. For example, this system to remove contaminants can be installed in a house or building being supplied with water from a centralized system. In such case, a solenoid would be installed on the incoming line to the house or building to be controlled by the sensor 27 on pressure tank 3. This solenoid would selectively open and close the incoming line, with the central system water pressure replacing the well pump pressure to obtain the required pressure differential to operate the venturi nozzle assembly.

We claim:

1. A system for removing contaminants from water under pressure comprising means to entrain sufficient air in the water substantially to oxidize contaminants contained in the water; first water supply line means fluidically connecting the means to entrain with an aeration and precipiation means; the aeration and precipitation means including an aeration tank having an inlet to spray the air laden water from the means to entrain into the pressurized air head to further expose the air laden water to oxygen, vent means in the air tank intermittently to remove excess air and any residual gases from the pressurized air head in the aeration tank, rocks in the bottom of the aeration tank having a surface layer thereon formed by the water in the water column depositing oxidized contaminants as a precipitate layer during movement through the rocks and a first outlet adjacent the bottom of the aeration tank, the water and any contaminants contained therein after passing through the rocks leaving the aeration tank through the first outlet; second water line means fluidically connecting the first outlet of the aeration and precipitation means with a filter tank; the filter tank having an opening, a second outlet and a filter bed therein, the water and any contaminants therein from the aeration and precipitation means sequentially passing through the opening, filter bed and second outlet of the filter tank finally to filter the water for selective delivery to service.

2. The system of claim 1 wherein the rocks are calcium carbonate and act to remove ferrous oxides from water moving through said calcium carbonate rocks to form the precipitate layer of ferric hydroxide on the surface of the rocks, which precipitate layer tends to help convert ferrous oxides in said water to precipitated ferric hydroxides.

3. The system of claim 1 wherein a manifold includes orifices in its inlet to spray the air laden water and further includes the vent means.

4. The system of claim 3 wherein said aeration and precipitation means further includes a float valve on said manifold operative to open when excess air volume builds up in said aeration tank to release the excess air to the vent means of the manifold.

5. The system of claim 4 wherein said float valve includes a valve core sealed to the manifold and having a bore therethrough and a float body buoyantly held by the water contained in the aeration tank to cooperate with said valve core to open or close the bore therethrough depending upon the level of water in the aeration tank.

6. The system of claim 5 wherein said float valve further includes a tubular guide mounted on the manifold and surrounding but spaced from the float body, said tubular guide having a stop extending thereacross to limit float body movement away from the valve core.

7. The system of claim 6 wherein said tubular guide has openings therein to allow excess air to be vented through the valve core bore and manifold vent means when the water level in the aeration tank fails to cause the float body to move away from the valve core.

8. The system of claim 1 or claim 7 wherein said means to entrain air in the water includes a venturi nozzle assembly having water inlet means and air inlet means.

9. The system of claim 8 wherein the venturi nozzle assembly has a venturi nozzle including a convergent section, a throat and a divergent section, said water inlet means introducing water into the convergent section of said venturi nozzle and said air inlet means introducing air by suction into the throat of said venturi nozzle to entrain and mix air in the water emerging from said divergent section of the venturi nozzle.

10. The system of claim 9 wherein said venturi nozzle assembly further includes water bypass means around the venturi nozzle and a double layer diaphragm normally extending across said bypass means, said double layer diaphragm flexing to allow water flow through said bypass means when sufficient water pressure builds up behind said double layer diaphragm.

11. The system of claim 10 wherein the water bypass means includes three circumferentially spaced bores in the venturi nozzle assembly.

12. The system of claim 1 wherein said filter bed in the filter tank is a mixture of an insoluble catalyst, nonhydrous aluminum silicate and calcium carbonate.

13. The system of claim 12 wherein the fitration tank has an underbed of gravel.

14. The system of claim 13 wherein said mixed bed further includes reactive magnesia oxide beads.

15. The system of claim 1 wherein the filter tank is superimposed on a water softener tank.

16. The system of claim 15 further comprising a central riser tube running through both the filter tank and the water softener tank and a coupling collar surrounding the riser tube and fluidically connecting the inside of the filter tank to the inside of the water softener tank.

17. The system of claim 16 wherein a first basket is positioned on the top of said coupling collar in said filtration tank and a second basket is positioned on the bottom of said coupling collar in said water softener tank and the water in the service mode passes downwardly through the filtration tank, first basket, coupling collar, second basket, water softening tank and then upwardly through the riser tube to service.

18. The system of claim 1 further comprising means to neutralize the water.

19. The system of claim 18 wherein said means to neutralize includes a neutralization tank filled with a mixed bed of calcium carbonate and reactive magnesia oxide beads.

20. The system of claim 19 wherein said means to neutralize is positioned upstream of said means to entrain excess air to hydrolyze hologenated organics contained in said water.

21. The system of claim 20 wherein a riser tube is contained in the mixed bed and water flows downwardly through the riser tube and then upwardly through the mixed bed for delivery to said means to entrain excess air.

22. The system of claim 21 wherein said filter tank has a multiple layer stratified bed including a layer of activated carbon, a layer of calcium carbonate and an underbed of gravel.

* * * * *

UNITED STATES PATENT AND TRADEMARK OFFICE
CERTIFICATE OF CORRECTION

PATENT NO. : 4,659,463

DATED : April 21, 1987

INVENTOR(S) : James W. Chandler, William D. Chandler

It is certified that error appears in the above-identified patent and that said Letters Patent is hereby corrected as shown below:

In claim 1, column 9, line 41, delete "the" and insert -- a --.

Signed and Sealed this

Fourth Day of October, 1988

Attest:

DONALD J. QUIGG

*Attesting Officer*          *Commissioner of Patents and Trademarks*

UNITED STATES PATENT AND TRADEMARK OFFICE
CERTIFICATE OF CORRECTION

PATENT NO. : 4,659,463

DATED : April 21, 1987

INVENTOR(S) : James W. Chandler, William D. Chandler

It is certified that error appears in the above-identified patent and that said Letters Patent is hereby corrected as shown below:

In claim 1, column 9, line 39, after "having" insert -- a pressurized air head and a moving column of water, a manifold on the aeration tank having -- .

In claim 3, column 10, line 1, after "wherein" delete "a" and insert therefor -- the -- .

Signed and Sealed this

Eleventh Day of April, 1989

Attest:

DONALD J. QUIGG

Attesting Officer

Commissioner of Patents and Trademarks